(12) United States Patent
Netsch et al.

(10) Patent No.: US 11,727,631 B2
(45) Date of Patent: Aug. 15, 2023

(54) DYNAMIC VARIABLE RATE SHADING

(71) Applicant: QUALCOMM Incorporated, San Diego, CA (US)

(72) Inventors: Matthew Netsch, Westminster, MA (US); Srihari Babu Alla, San Diego, CA (US); Avinash Seetharamaiah, San Diego, CA (US); Jonnala Gadda Nagendra Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/482,296

(22) Filed: Sep. 22, 2021

(65) Prior Publication Data

US 2023/0086288 A1  Mar. 23, 2023

(51) Int. Cl.
| | |
|---|---|
| G06T 15/80 | (2011.01) |
| G06T 15/00 | (2011.01) |
| G06T 9/00 | (2006.01) |
| G06T 7/90 | (2017.01) |
| G06T 11/00 | (2006.01) |
| G09G 5/02 | (2006.01) |
| H04N 1/60 | (2006.01) |

(52) U.S. Cl.
CPC ............... *G06T 15/80* (2013.01); *G06T 7/90* (2017.01); *G06T 9/00* (2013.01); *G06T 15/005* (2013.01)

(58) Field of Classification Search
CPC ......... G06T 15/80; G06T 15/005; G06T 9/00; G06T 7/90; G06T 11/001; G06T 2207/10016; G06T 2207/10024; G06T 7/11; G06T 7/20; G06T 7/38; G09G 5/02; G09G 5/06; G09G 2320/04; H04N 1/60; H04N 19/167; H04N 19/184; H04N 13/139; H04N 13/15; H04N 13/1354; H04N 9/64; H04N 9/04521; H04N 1/6041; H04N 1/6077
USPC ........................................................ 345/426
See application file for complete search history.

(56) References Cited

U.S. PATENT DOCUMENTS

| 11,302,287 | B1 * | 4/2022 | Allard ........................ G06T 1/20 |
| 11,315,214 | B2 * | 4/2022 | Liebenow ............... G06F 3/012 |
| 2012/0277509 | A1 * | 11/2012 | Thorman ................. C07C 2/862 |
| | | | 585/323 |

(Continued)

OTHER PUBLICATIONS

International Search Report and Written Opinion—PCT/US2022/041571—ISA/EPO—Feb. 10, 2023.

(Continued)

*Primary Examiner* — Wesner Sajous
(74) *Attorney, Agent, or Firm* — Procopio, Cory Hargreaves & Savitch LLP

(57) ABSTRACT

Aspects presented herein relate to methods and devices for graphics processing including an apparatus, e.g., a GPU. The apparatus may perform a color analysis on at least one first frame of a plurality of frames, the color analysis being performed based on at least one image in the at least one first frame. The apparatus may also generate a frequency map for at least one second frame of the plurality of frames based on the performed color analysis. Further, the apparatus may render the at least one second frame based on the frequency map for the at least one second frame, the at least one second frame being rendered after the at least one first frame.

30 Claims, 9 Drawing Sheets

(56) References Cited

U.S. PATENT DOCUMENTS

| | | | |
|---|---|---|---|
| 2014/0253990 A1* | 9/2014 | Perkins | H04N 9/3152 359/19 |
| 2015/0304640 A1* | 10/2015 | Brooks | H04N 13/122 348/56 |
| 2019/0124745 A1* | 4/2019 | Mason | G06K 9/6219 |
| 2021/0217203 A1* | 7/2021 | Kim | G06T 17/20 |

OTHER PUBLICATIONS

NVIDIA: "NVIDIA Turing GPU Architecture", 2018, 86 Pages, XP055679661, p. 42-p. 46.

Yang L., et al., "NVIDIA Adaptive Shading Overview", Agenda, Introduction to Variable Rate Shading (VRS), Mar. 22, 2019, XP055941865, 79 Pages.

Yang L., et al., "Visually Lossless Content and Motion Adaptive Shading in Games", Proceedings of the ACM on Computer Graphics and Interactive Techniques, ACM, 2 Penn Plaza, Suite 701 New YorkNY10121-0701USA, vol. 2, No. 1, Jun. 3, 2019, pp. 1-19, XP058430622.

* cited by examiner

DYNAMIC VARIABLE RATE SHADING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that may perform graphics processing. The apparatus may generate one or more of at least one first frame or at least one second frame based on application data. The apparatus may also select at least one image in the at least one first frame based on application data, where a color analysis is performed based on the selected at least one image. Additionally, the apparatus may compress one or more tiles of the at least one first frame, where a color analysis is performed based on the compressed one or more tiles. The apparatus may also perform a color analysis on at least one first frame of a plurality of frames, the color analysis being performed based on at least one image in the at least one first frame. The apparatus may also generate a frequency map for at least one second frame of the plurality of frames based on the performed color analysis. Moreover, the apparatus may select frequency data for the at least one second frame based on the frequency map for the at least one second frame. The apparatus may also render the at least one second frame based on the frequency map for the at least one second frame, the at least one second frame being rendered after the at least one first frame. The apparatus may also transmit, to a display or a buffer, the at least one second frame, where the at least one second frame is transmitted after the at least one second frame is rendered based on the frequency map.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
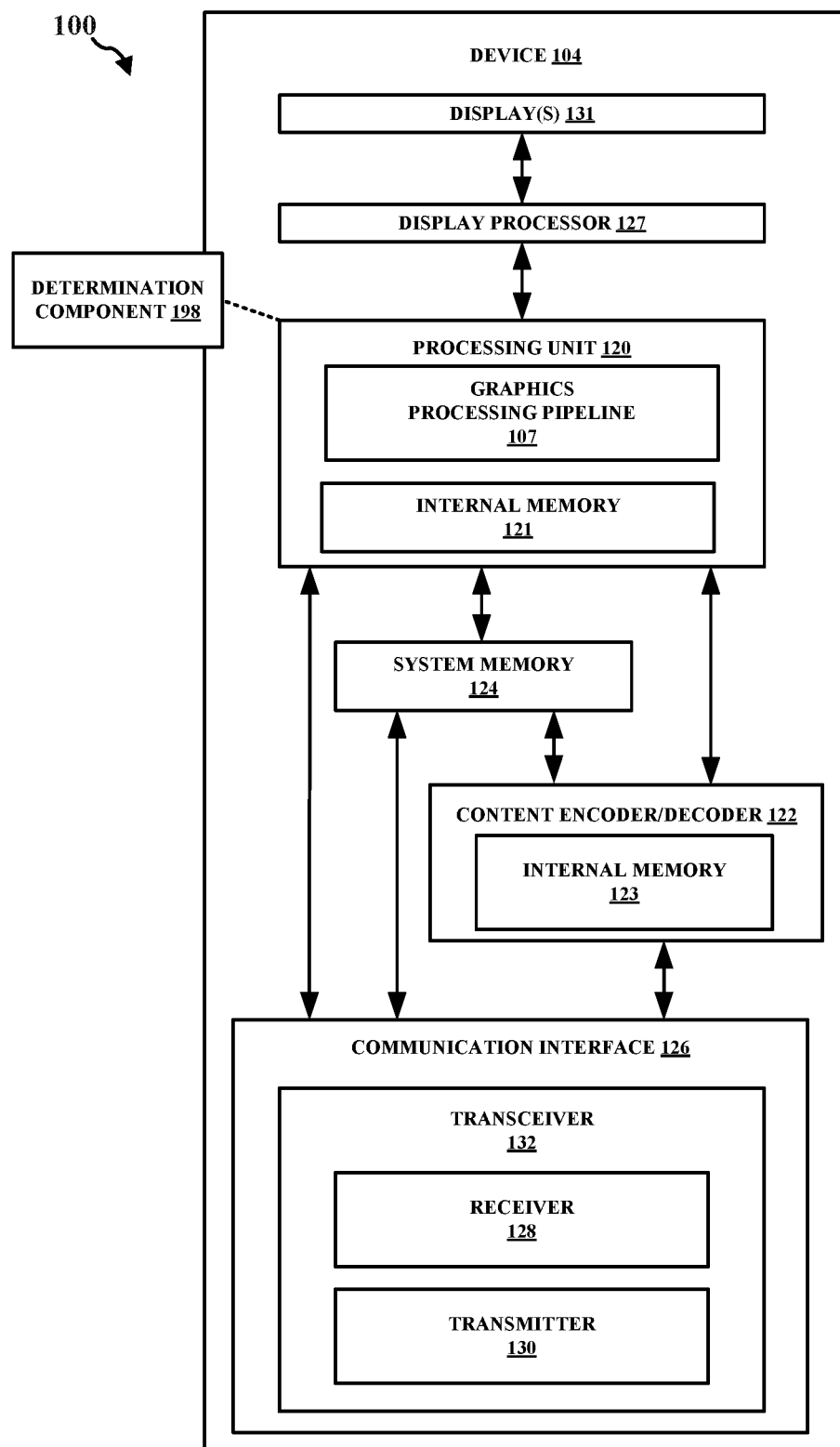
FIG. 1 is a block diagram that illustrates an example content generation system in accordance with one or more techniques of this disclosure.

Some aspects of graphics processing may utilize different types of shading, e.g., variable rate shading (VRS). Variable rate shading is a manner in which to allocate rendering performance or power at varying rates. For example, variable rate shading may be utilized by a graphics processing unit (GPU) to allocate rendering performance/power at varying rates across a rendered image. That is, variable rate shading is a feature that increases rendering performance and quality by varying the shading rate for different regions of an image or frame. In some instances, variable rate shading may significantly increase the performance of certain applications by reducing the amount of work performed or executed at a GPU. As variable rate shading may provide an increased performance benefit, it may be beneficial to include an automatic or dynamic manner in which to expose it, such as via application or game profiles. However, exposing variable rate shading across an entire frame may lead to large amounts of noticeable sub-quality rendering or rendering with varied content quality. This varied rendering quality may cause an application to craft specific rates for its respective content. Further, some applications may not utilize the variable rate shading feature, as this may introduce corruption if applied generally. Aspects of the present disclosure may automatically or dynamically enable variable rate shading. For instance, aspects of the present disclosure may automatically or dynamically enable variable rate shading for rendering applications at a GPU without introducing any corruption in output content. Moreover, aspects of the present disclosure may utilize dynamic variable rate shading to increase the performance of a GPU. The dynamic variable rate shading of the present disclosure may also result in a power or thermal savings at a GPU, such as due to a reduction in fragment shader invocations.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing.

In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to generate one or more of at least one first frame or at least one second frame based on application data. The determination component 198 may also be configured to select at least one image in the at least one first frame based on application data, where a color analysis is performed based on the selected at least one image. The determination component 198 may also be configured to compress one or more tiles of the at least one first frame, where a color analysis is performed based on the compressed one or more tiles. The determination component 198 may also be configured to perform a color analysis on at least one first frame of a plurality of frames, the color analysis being performed based on at least one image in the at least one first frame. The determination component 198 may also be configured to generate a frequency map for at least one second frame of the plurality of frames based on the performed color analysis. The determination component 198 may also be configured to select frequency data for the at least one second frame based on the frequency map for the at least one second frame. The determination component 198 may also be configured to render the at least one second frame based on the frequency map for the at least one second frame, the at least one second frame being rendered after the at least one first frame. The determination component 198 may also be configured to transmit, to a display or a buffer, the at least one second frame, where the at least one second frame is transmitted after the at least one second frame is rendered based on the frequency map. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
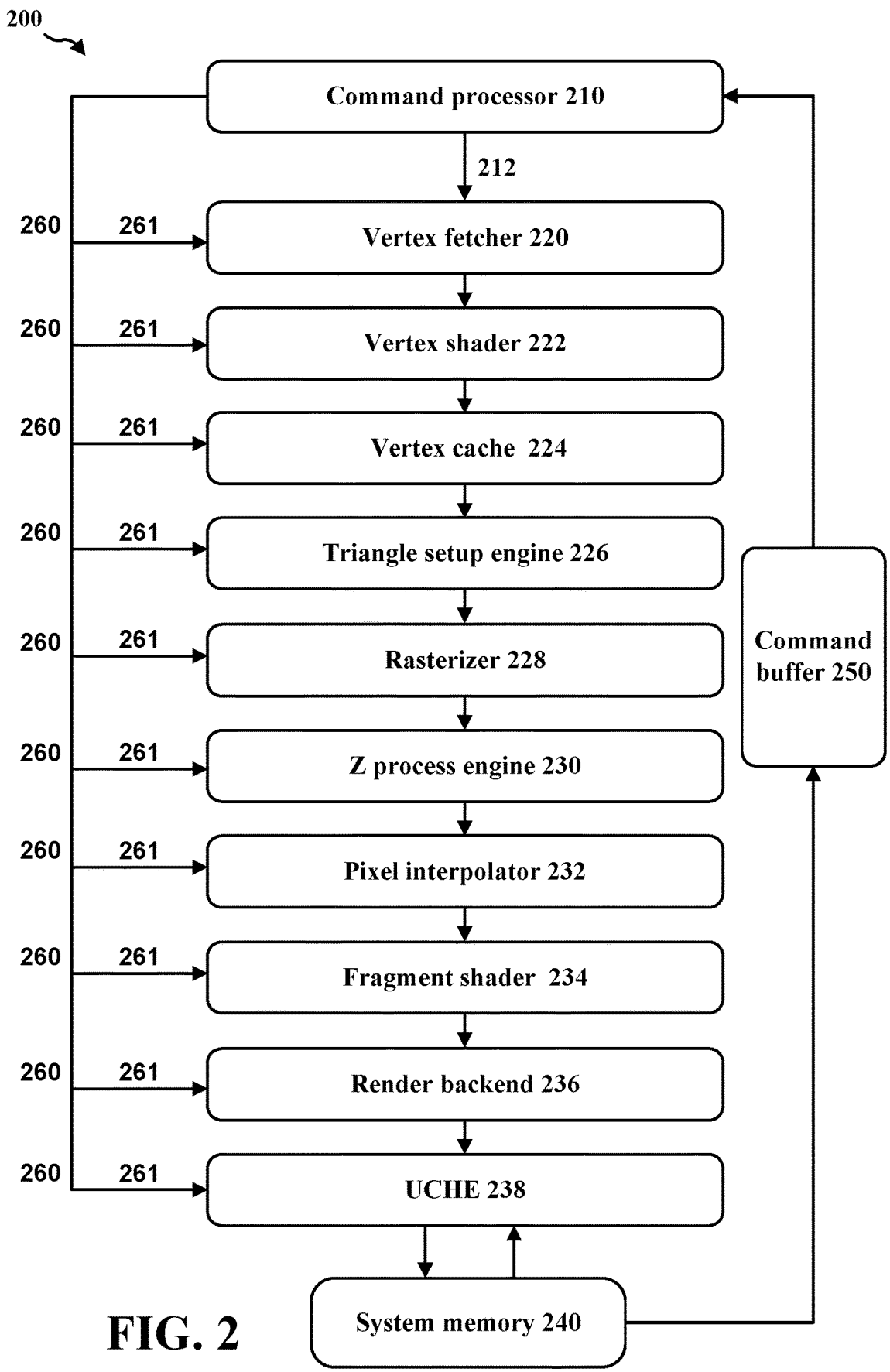
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call data packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In some aspects, GPUs may apply the drawing or rendering process to different bins or tiles. For instance, a GPU may render to one bin, and perform all of the draws for the primitives or pixels in the bin. During the process of rendering to a bin, the render targets may be located in the GMEM. In some instances, after rendering to one bin, the content of the render targets may be moved to a system memory and the GMEM may be freed for rendering the next bin. Additionally, a GPU may render to another bin, and perform the draws for the primitives or pixels in that bin. Therefore, in some aspects, there might be a small number of bins, e.g., four bins, that cover all of the draws in one surface. Further, GPUs may cycle through all of the draws in one bin, but perform the draws for the draw calls that are visible, i.e., draw calls that include visible geometry. In some aspects, a visibility stream may be generated, e.g., in a binning pass, to determine the visibility information of each primitive in an image or scene. For instance, this visibility stream may identify whether a certain primitive is visible or not. In some aspects, this information may be used to remove primitives that are not visible, e.g., in the rendering pass. Also, at least some of the primitives that are identified as visible may be rendered in the rendering pass.

In some aspects of tiled rendering, there may be multiple processing phases or passes. For instance, the rendering may be performed in two passes, e.g., a visibility or bin-visibility pass and a rendering or bin-rendering pass. During a visibility pass, a GPU may input a rendering workload, record the positions of the primitives or triangles, and then determine which primitives or triangles fall into which bin or area. In some aspects of a visibility pass, GPUs may also identify or mark the visibility of each primitive or triangle in a visibility stream. During a rendering pass, a GPU may input the visibility stream and process one bin or area at a time. In some aspects, the visibility stream may be analyzed to determine which primitives, or vertices of primitives, are visible or not visible. As such, the primitives, or vertices of primitives, that are visible may be processed. By doing so, GPUs may reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information may be used to determine or generate a visibility stream. In a rendering pass, the primitives in each bin may be rendered separately. In these instances, the visibility stream may be fetched from memory used to drop primitives which are not visible for that bin.

Some aspects of GPUs or GPU architectures may provide a number of different options for rendering, e.g., software rendering and hardware rendering. In software rendering, a driver or CPU may replicate an entire frame geometry by processing each view one time. Additionally, some different states may be changed depending on the view. As such, in software rendering, the software may replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware may manage the replication or processing of the primitives or triangles for each viewpoint in an image.

Figure 3:
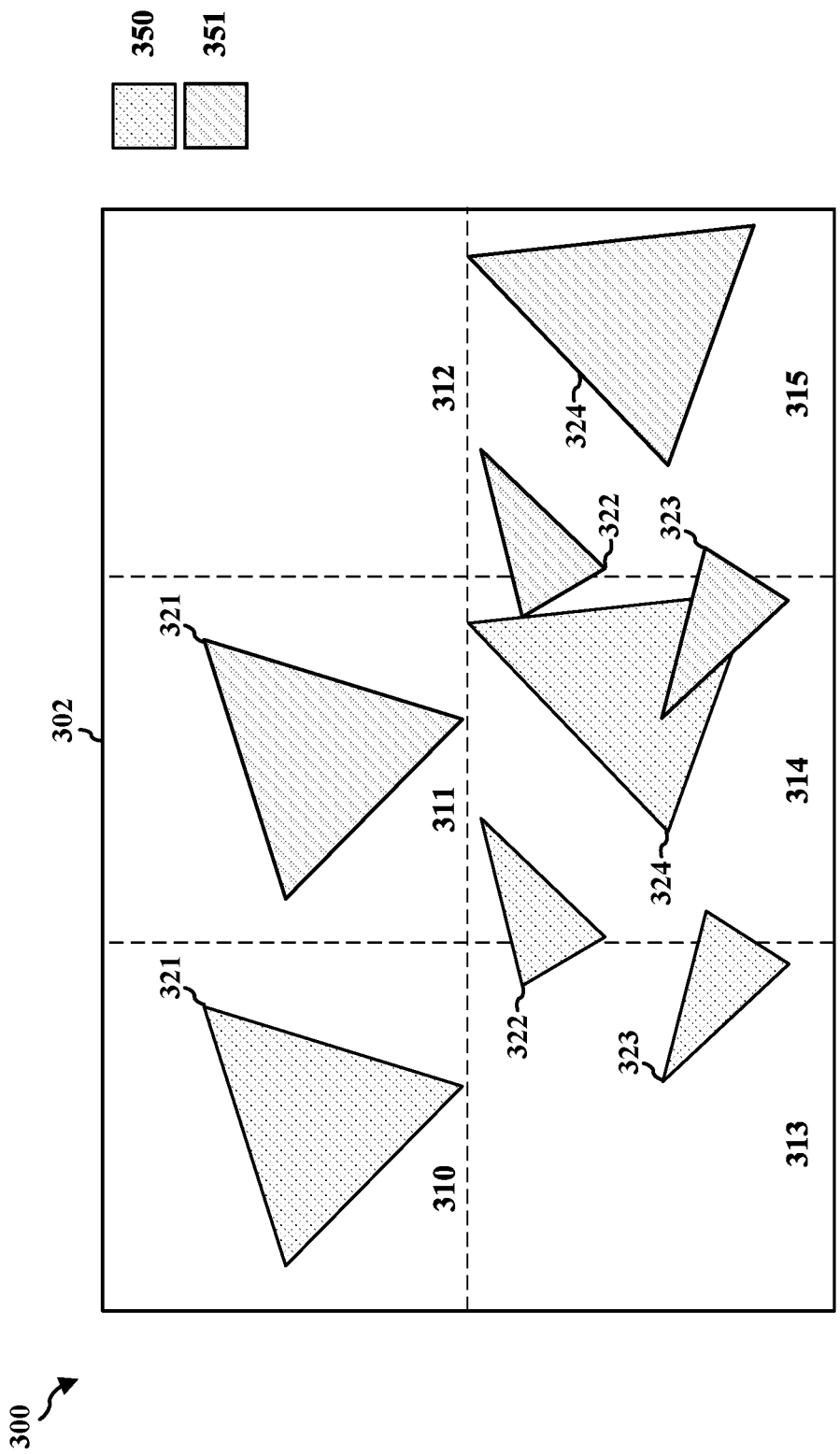
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 may utilize multiple viewpoints or multi-view rendering.

As indicated herein, GPUs or graphics processor units may use a tiled rendering architecture to reduce power consumption or save memory bandwidth. As further stated above, this rendering method may divide the scene into multiple bins, as well as include a visibility pass that identifies the triangles that are visible in each bin. Thus, in tiled rendering, a full screen may be divided into multiple bins or tiles. The scene may then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer may be a portion of memory or random access memory (RAM), e.g., containing a bitmap or storage, to help store display data for a GPU. The frame buffer may also be a memory buffer containing a complete frame of data. Additionally, the frame buffer may be a logic buffer. In some aspects, updating the frame buffer may be performed in bin or tile rendering, where, as discussed above, a surface is divided into multiple bins or tiles and then each bin or tile may be separately rendered. Further, in tiled rendering, the frame buffer may be partitioned into multiple bins or tiles.

Some aspects of graphics processing may utilize different types of shading, e.g., variable rate shading (VRS). Variable rate shading is a manner in which to allocate rendering performance or power at varying rates. For example, variable rate shading may be utilized by a graphics processing unit (GPU) to allocate rendering performance/power at varying rates across a rendered image. That is, variable rate shading is a feature that increases rendering performance and quality by varying the shading rate for different regions of an image or frame. In addition, variable rate shading may be referred to as coarse pixel shading.

In some instances, variable rate shading may significantly increase the performance of certain applications by reducing the amount of work performed or executed at a graphics processing unit (GPU). For example, variable rate shading may reduce the number of times that a fragment shader executes instructions at a GPU. Variable rate shading may also result in a reduced shading rate with a small amount of perceptible visual disparity. For instance, variable rate shading may result in a reduced shading rate with little or no reduction in perceptible visual quality at the output image.

Figure 4:
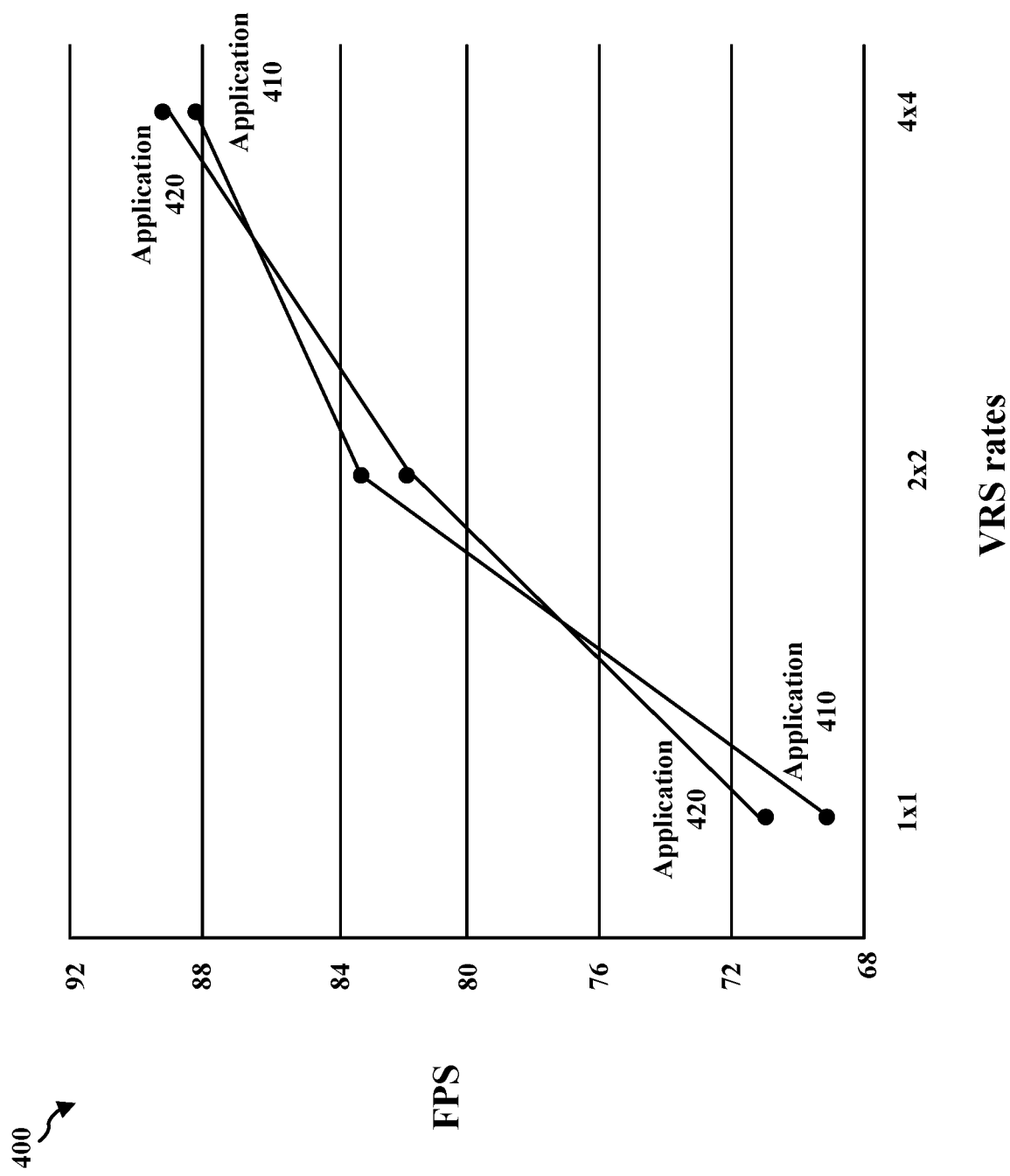
FIG. 4 is a graph illustrating an example of a GPU rendering performance.

FIG. 4 illustrates a graph 400 of one example of a GPU rendering performance utilizing VRS rates. More specifically, graph 400 in FIG. 4 displays a rendering performance with an amount of frames per second (fps) utilizing VRS rates with forced draw states. As shown in FIG. 4, the amount of fps for different applications (e.g., application 410 and application 420) may increase with an increasing amount of forced draw state VRS rates. For example, for 1×1 variable rate shading, the fps may be 69 and 71 for application 410 and application 420, respectively. For 2×2 variable rate shading, the fps may be 83 and 82 for application 410 and application 420, respectively. For 4×4 variable rate shading, the fps may be 88 and 89 for application 410 and application 420, respectively. As depicted in FIG. 4, variable rate shading may significantly increase the performance of certain applications by reducing the amount of work performed or executed at a GPU.

In some aspects, variable rate shading may preserve the edge content of output images, which may mitigate the corruption in displayed content. However, it may be possible to render content that displays a large amount of corruption near the edges of displayed content. For example, if an entire field of grass is rendered as a single unit, there may be edge aliasing since each blade of grass does not include a mesh of primitives. This is one of the reasons why certain applications select their individual variable shading rates to fit their respective content.

As variable rate shading may provide an increased performance benefit, it may be beneficial to include an automatic or dynamic manner in which to expose it, such as via application or game profiles. However, exposing variable rate shading across an entire frame may lead to large amounts of noticeable sub-quality rendering or rendering with varied content quality. This varied rendering quality may cause an application to craft specific rates for its respective content. Further, some applications may not utilize the variable rate shading feature, as this may introduce corruption if applied generally. As such, it may be beneficial to automatically or dynamically enable variable rate shading. For instance, it may be beneficial to automatically or dynamically enable variable rate shading for rendering applications at a GPU without introducing any corruption in the output content. Further, it may be beneficial to utilize dynamic variable rate shading to increase the performance of a GPU.

Aspects of the present disclosure may automatically or dynamically enable variable rate shading. For instance, aspects of the present disclosure may automatically or dynamically enable variable rate shading for rendering applications at a GPU without introducing any corruption in output content. Moreover, aspects of the present disclosure may utilize dynamic variable rate shading to increase the performance of a GPU. The dynamic variable rate shading of the present disclosure may also result in a power or thermal savings at a GPU, such as due to a reduction in fragment shader invocations.

Additionally, aspects of the present disclosure may utilize dynamic variable rate shading in a compute pass to perform a color analysis on frame data. For instance, a compute pass of a GPU may be utilized to perform a color analysis on frame data to construct a VRS image for use in a subsequent frame. The color analysis may be employed to determine regions where there is a large contrast and thus may need more high quality VRS rates. This may greatly reduce the amount of corruption and make a quality difference in display content imperceptible.

In some instances, aspects of the present disclosure may utilize frame metadata to allow for conversion to VRS rates. For instance, analyzing frame data may take a large amount of time depending on the size of the frame and/or geometry buffer. Aspects of the present disclosure may instead read the metadata (e.g., bandwidth compression metadata) of the frame and perform a simple conversion (e.g., a lookup table (LUT) conversion) to VRS rates. For example, this may work because hardware already assists in performing the color analysis when compressing UBWC tiles (i.e., tiles with a small amount of detail).

Aspects of the present disclosure may automatically obtain an increase of a certain amount of frames per second (fps) without introducing corruption and maintaining the same degree of performance in the compute pass to generate an image. For example, aspects of the present disclosure may increase the overall performance by an amount of fps, e.g., around 10 fps, without introducing corruption and utilize a similar performance in the compute pass to generate the image. In some instances, in order to avoid corruption based on a frame-to-frame delta, aspects of the present disclosure may introduce a filter kernel, e.g., a minimum filter kernel. By introducing a minimum filter kernel, aspects of the present disclosure may to convert data in the VRS image during the compute pass.

Additionally, aspects of the present disclosure may use GPU hardware to eliminate or reduce a compute pass. For instance, a compute pass may be eliminated by adding a graphics memory (GMEM) system resolve that converts bandwidth compression metadata into a VRS image. This conversion of bandwidth compression metadata into a VRS image may be a lookup table (LUT) conversion. Further, aspects of the present disclosure may allow GPU hardware to dynamically generate buffer data. For example, low resolution z pass (LRZ) quality buffer data may be dynamically generated by GPU hardware during a visibility pass to use in the render pass of a same frame.

In some instances, aspects of the present disclosure may utilize previous frame data to create a variable rate shading image for a subsequent frame. Aspects of the present disclosure may also perform a color analysis in a compute pass that selects rates based on details in a frame. Further, aspects of the present disclosure may determine which render passes to apply to a VRS image, e.g., based on heuristics. For example, a GPU driver may determine with heuristics which render passes to apply to a VRS image. This determination by the GPU driver may target a main geometry buffer (Gbuffer) pass. This GPU driver determination may also be enabled as user gaming profiles or be enabled with an application detection.

Figure 5:
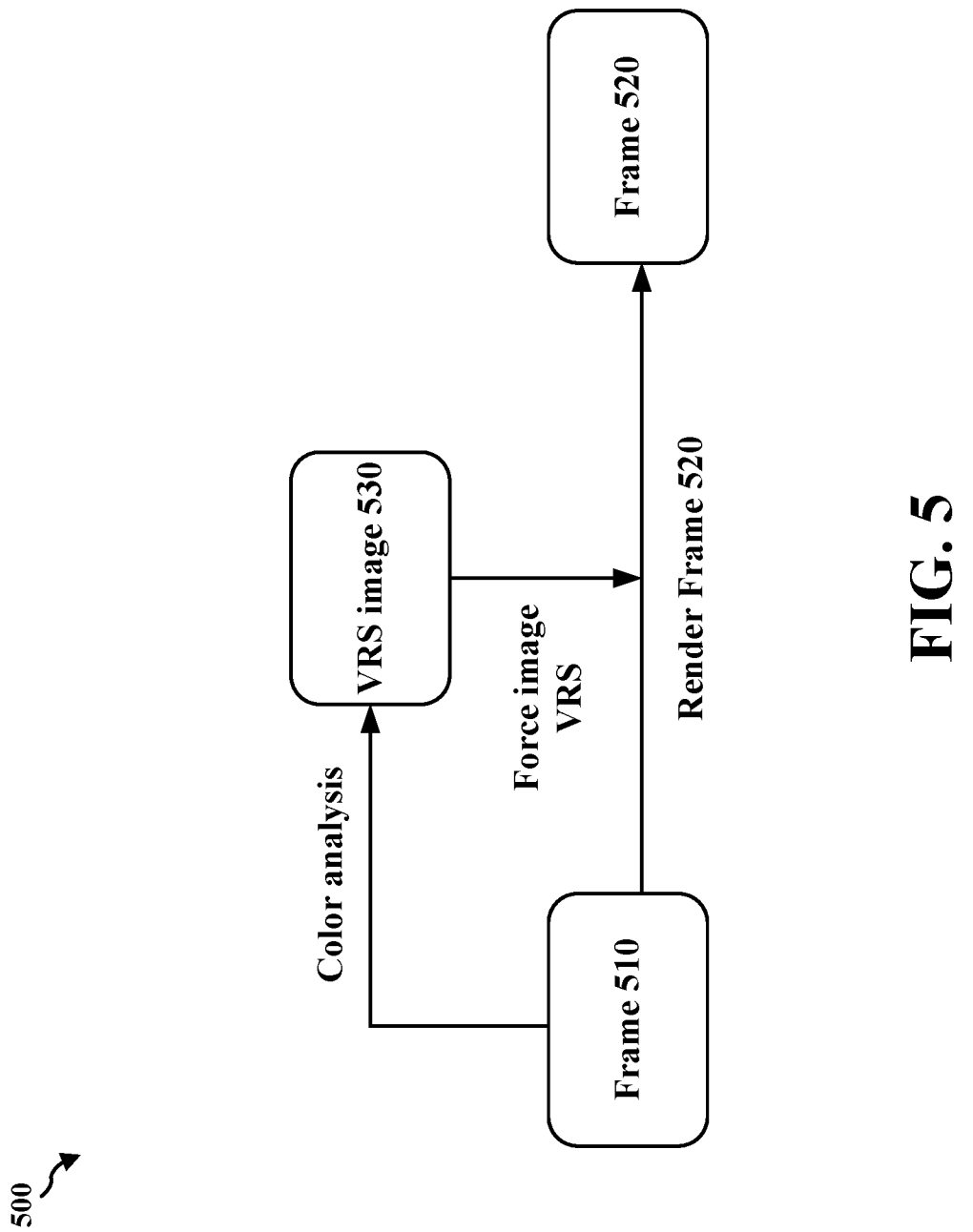
FIG. 5 is a diagram illustrating an example dynamic variable rate shading process.

FIG. 5 illustrates a diagram 500 of one example of a dynamic variable rate shading process according to aspects of the present disclosure. As shown in FIG. 5, diagram 500 is an example dynamic variable rate shading process including first frame 510, second frame 520, and VRS image 530. More specifically, FIG. 5 displays that a color analysis may be performed on first frame 510, where the color analysis is performed based on an image in the first frame 510. Also, VRS image 530 or frequency map may be generated for second frame 520 based on the color analysis. Moreover, second frame 520 may be rendered based on the VRS image 530 or frequency map for the second frame, where the second frame 520 is rendered after the first frame 510.

As shown in FIG. 5, aspects of the present disclosure may utilize previous frame data (e.g., data for first frame 510) to create a VRS image (e.g., VRS image 530) for a subsequent frame (e.g., second frame 520). Additionally, as indicated in FIG. 5, aspects of the present disclosure may perform a color analysis in a compute pass that selects VRS rates based on details in first frame 510. As further depicted in FIG. 5, aspects of the present disclosure may utilize a GPU driver to determine which render passes to apply to VRS image 530. Aspects of the present disclosure may utilize heuristics to make this determination regarding which render passes to apply to VRS image 530.

In some aspects, a compute pass at a GPU may read data for an entire frame in order to perform color analysis, such as for a large frame including 20 MB or more. Aspects of the present disclosure may utilize GPU hardware to perform this color analysis for the frame when compressing the tiles of the frame, e.g., UBWC tiles. For instance, the compute pass may read bandwidth compression metadata for the tile and convert a compressed tile size into a VRS rate. The may result in a substantial bandwidth reduction, e.g., a 96% bandwidth reduction, on an application or game. Further, the compute pass may read the bandwidth compression metadata which may result in a reduction in complex work at the arithmetic logic unit (ALU) of the GPU. The compute pass may also run the bandwidth compression metadata on another application unit, e.g., a less privileged application container (LPAC).

Additionally, in some aspects of the present disclosure, dynamic variable rate shading associated with bandwidth compression metadata hardware may eliminate noticeable corruption in output content. This may result in a substantial gain in fps for the output content, e.g., a gain of 10 fps in some applications. In some instances, applying a VRS image to a subsequent frame may not result in any new noticeable corruption for the output content. For instance, applying a VRS image to a subsequent frame may mitigate noticeable corruption for the output content by using a minimum filter on the VRS image generation to account for any differences in the previous frame and the subsequent frame.

Figure 6:
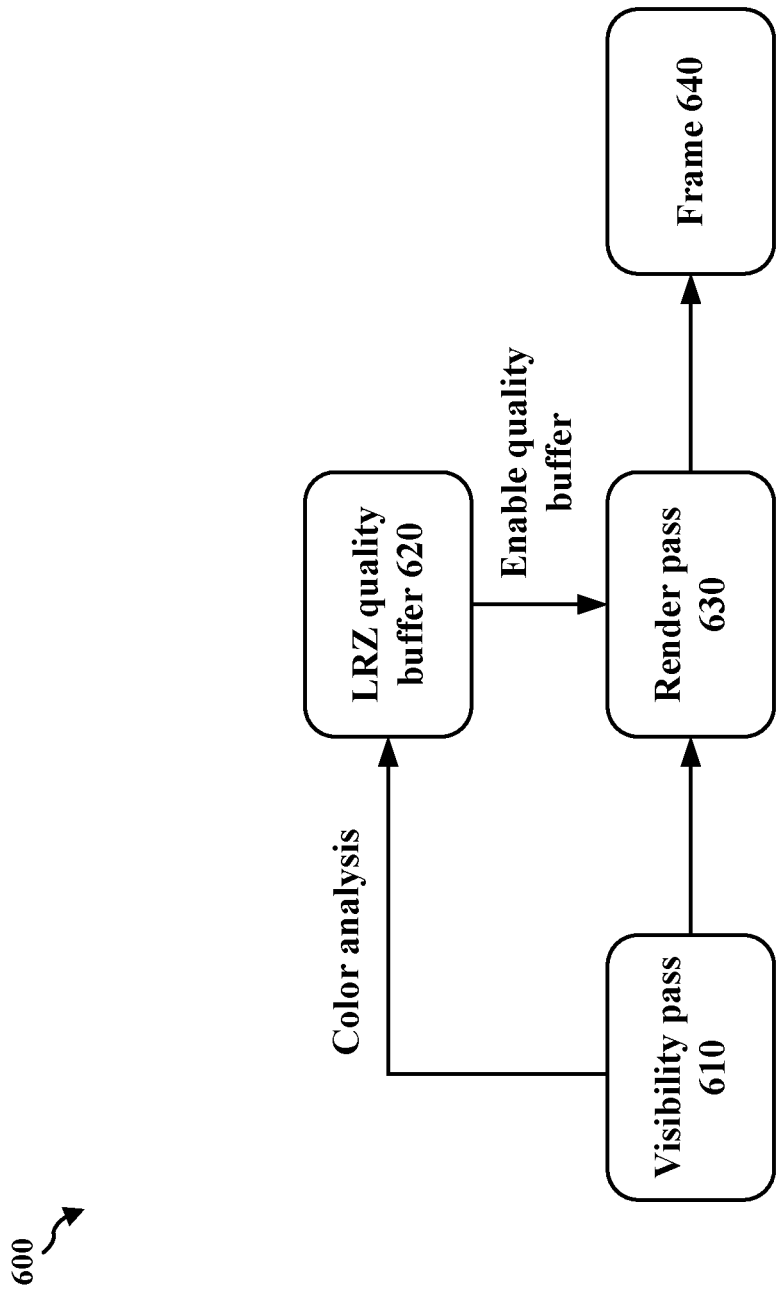
FIG. 6 is a diagram illustrating an example dynamic variable rate shading process.

FIG. 6 illustrates a diagram 600 of one example of a dynamic variable rate shading process according to aspects of the present disclosure. As shown in FIG. 6, diagram 600 is an example dynamic variable rate shading process including visibility pass 610, low resolution z pass (LRZ) quality buffer 620, render pass 630, and frame 640. More specifically, FIG. 6 displays that a color analysis may be performed after the visibility pass 610, where the color analysis is performed on the LRZ quality buffer 620. Also, aspects of the present disclosure may enable the LRZ quality buffer 620 prior to the render pass 630.

As shown in FIG. 6, aspects of the present disclosure may map to certain VRS rates. For instance, mapping to VRS rates may be simple enough that GPU hardware may generate the VRS image directly with a resolve from a graphics memory (GMEM) to a system memory (SMEM). This GMEM-to-SMEM resolve may eliminate the need for a compute pass. Further, as depicted in FIG. 6, the GPU hardware may run an analysis during the visibility pass 610 and apply VRS rates to the render pass 630.

In some instances, aspects of the present disclosure may utilize compression formats without certain types of compression, e.g., bandwidth compression or any compression that includes metadata. Also, aspects of the present disclosure may utilize metadata from certain compression formats, e.g., bandwidth compression, to generate a frequency map for use in other applications, i.e., applications other than VRS.

Aspects of the present disclosure may include a number of different benefits or advantages. For instance, aspects of the present disclosure may utilize dynamic variable rate shading to increase the performance of a GPU with a minor increase in GPU hardware utilization. For example, aspects of the present disclosure may result in a 15% to 35% performance increase at the GPU. Additionally, aspects of the present disclosure may provide a power or thermal savings at the GPU due to a reduction in fragment shader invocations. Aspects of the present disclosure may be automatically initiated for an application with minimal resulting corruption to the output content. Further, aspects of the present disclosure may result in a boost to certain applications, as well as increase an amount of user control for an application, e.g., a profiles application. Aspects of the present disclosure may also allow a user to control the degree of VRS rates and corresponding amount of output content corruption. For instance, some users may select a larger amount of corruption if it results in a higher fps, while other users may select a smaller amount of corruption for output content with more clarity.

Figure 7:
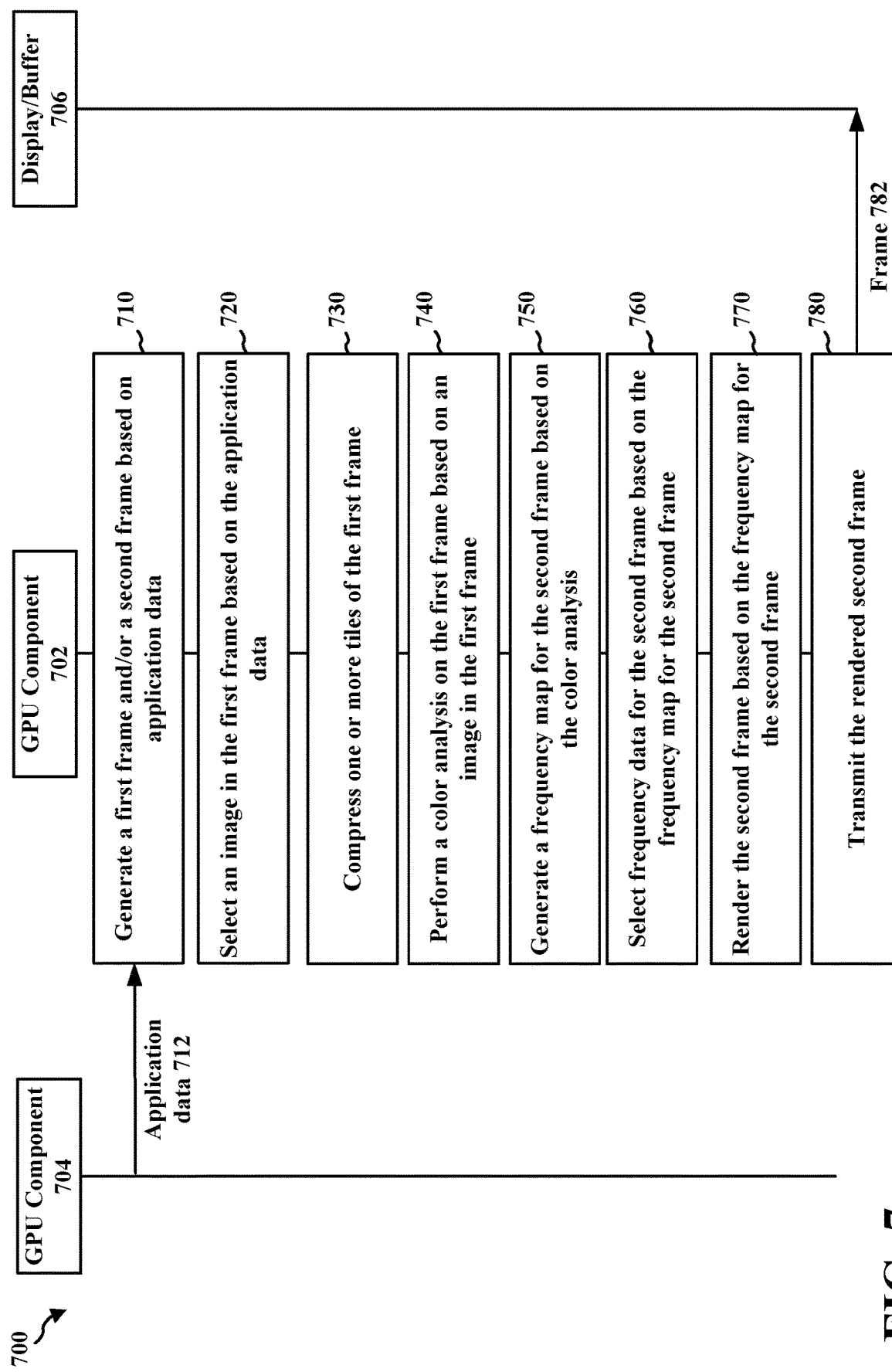
FIG. 7 is a communication flow diagram illustrating example communications between a GPU component, another GPU component, and a display/buffer.

FIG. 7 is a communication flow diagram 700 of graphics processing in accordance with one or more techniques of this disclosure. As shown in FIG. 7, diagram 700 includes example communications between GPU component 702 (e.g., a component in a GPU pipeline), GPU component 704 (e.g., another component in a GPU pipeline), and display or buffer 706, in accordance with one or more techniques of this disclosure.

At 710, GPU component 702 may generate one or more of at least one first frame or at least one second frame based on application data. For instance, the at least one first frame and/or the at least one second frame may be generated at GPU component 702 based on application data 712 received from GPU component 704.

At 720, GPU component 702 may select at least one image in the at least one first frame based on application data, where a color analysis is performed based on the selected at least one image. In some instances, the at least one image may be associated with a geometry buffer of the at least one first frame. Also, the application data may correspond to heuristics of the at least one first frame.

At 730, GPU component 702 may compress one or more tiles of the at least one first frame, where a color analysis is performed based on the compressed one or more tiles. The compressed one or more tiles may correspond to compressed metadata of the at least one first frame.

At 740, GPU component 702 may perform a color analysis on at least one first frame of a plurality of frames, the color analysis being performed based on at least one image in the at least one first frame. The color analysis may be performed via a compute pass at a graphics processing unit (GPU) or via hardware at the GPU.

At 750, GPU component 702 may generate a frequency map for at least one second frame of the plurality of frames based on the performed color analysis. In some aspects, the frequency map may be a lookup table (LUT). For instance, generating the frequency map may include generating a lookup table (LUT) based on the color analysis.

In some instances, the frequency map may be filtered to account for a difference between the at least one first frame and the at least one second frame. The difference between the at least one first frame and the at least one second frame may correspond to a frame delta. Further, the frequency map may be filtered based on a kernel. The frequency map may also correspond to a variable rate shading (VRS) image.

At 760, GPU component 702 may select frequency data for the at least one second frame based on the frequency map for the at least one second frame. The frequency data for the at least one second frame may correspond to one or more variable rate shading (VRS) rates.

At 770, GPU component 702 may render the at least one second frame based on the frequency map for the at least one second frame, the at least one second frame being rendered after the at least one first frame.

At 780, GPU component 702 may transmit, to a display or a buffer, the at least one second frame, e.g., frame 782, where the at least one second frame is transmitted after the at least one second frame is rendered based on the frequency map. For instance, GPU component 702 may transmit frame 782 to display or buffer 706.

Figure 8:
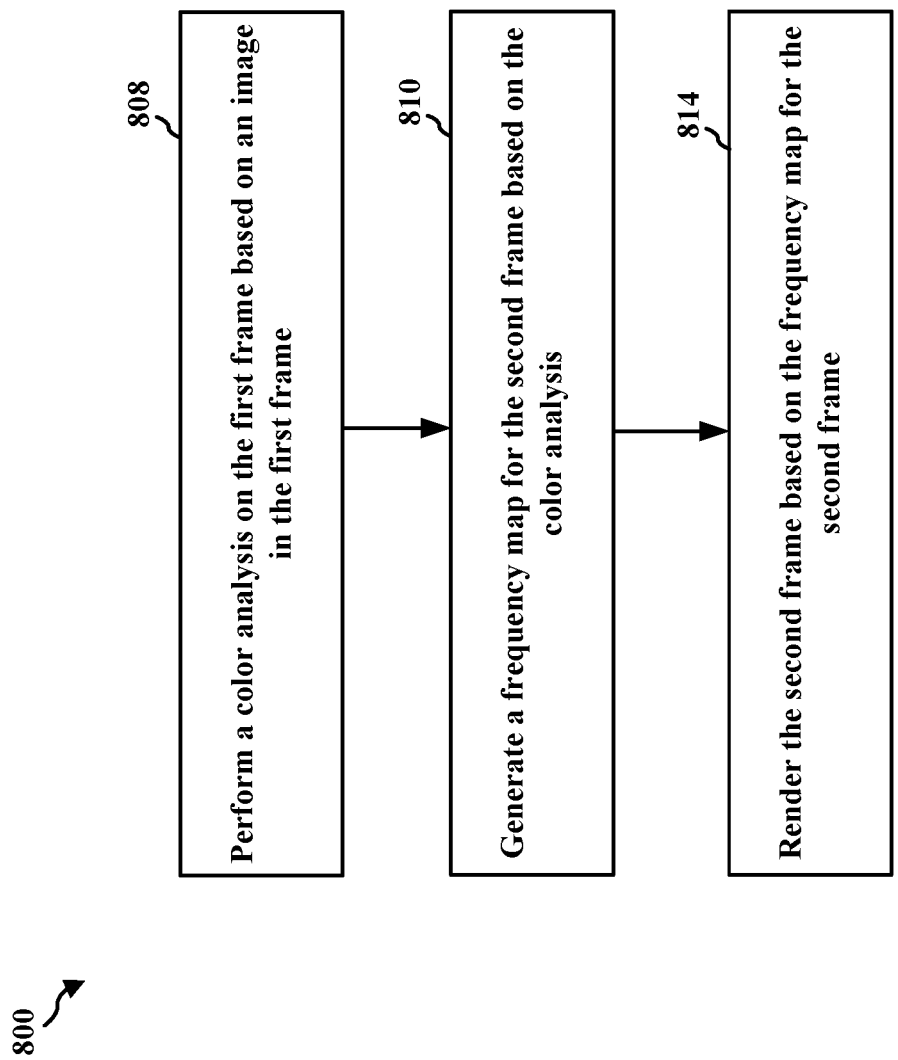
FIG. 8 is a flowchart of an example method of graphics processing.

FIG. 8 is a flowchart 800 of an example method of graphics processing in accordance with one or more techniques of this disclosure. The method may be performed by a GPU, such as an apparatus for graphics processing, another graphics processor, a GPU pipeline, a wireless communication device, and/or any apparatus that may perform graphics processing as used in connection with the examples of FIGS. 1-7.

At 808, the GPU may perform a color analysis on at least one first frame of a plurality of frames, the color analysis being performed based on at least one image in the at least one first frame, as described in connection with the examples in FIGS. 1-7. For example, as described in 740 of FIG. 7, GPU component 702 may perform a color analysis on at least one first frame of a plurality of frames, the color analysis being performed based on at least one image in the at least one first frame. Further, step 808 may be performed by processing unit 120 in FIG. 1. The color analysis may be performed via a compute pass at a graphics processing unit (GPU) or via hardware at the GPU.

At 810, the GPU may generate a frequency map for at least one second frame of the plurality of frames based on the performed color analysis, as described in connection with the examples in FIGS. 1-7. For example, as described in 750 of FIG. 7, GPU component 702 may generate a frequency map for at least one second frame of the plurality of frames based on the performed color analysis. Further, step 810 may be performed by processing unit 120 in FIG. 1. In some aspects, the frequency map may be a lookup table (LUT). For instance, generating the frequency map may include generating a lookup table (LUT) based on the color analysis.

In some instances, the frequency map may be filtered to account for a difference between the at least one first frame and the at least one second frame. The difference between the at least one first frame and the at least one second frame may correspond to a frame delta. Further, the frequency map may be filtered based on a kernel. The frequency map may also correspond to a variable rate shading (VRS) image.

At 814, the GPU may render the at least one second frame based on the frequency map for the at least one second frame, the at least one second frame being rendered after the at least one first frame, as described in connection with the examples in FIGS. 1-7. For example, as described in 770 of FIG. 7, GPU component 702 may render the at least one second frame based on the frequency map for the at least one second frame, the at least one second frame being rendered after the at least one first frame. Further, step 814 may be performed by processing unit 120 in FIG. 1.

Figure 9:
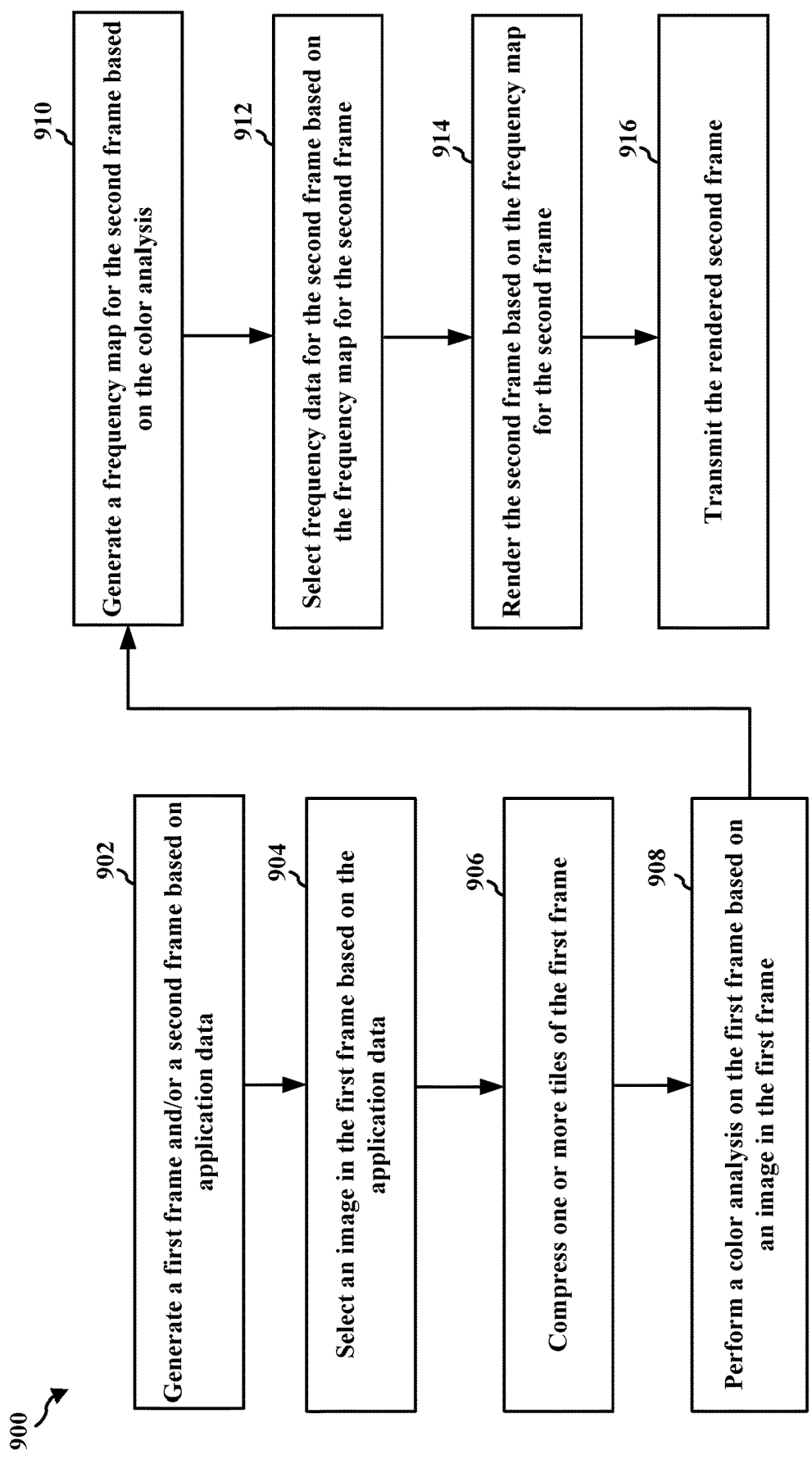
FIG. 9 is a flowchart of an example method of graphics processing.

FIG. 9 is a flowchart 900 of an example method of graphics processing in accordance with one or more techniques of this disclosure. The method may be performed by a GPU, such as an apparatus for graphics processing, another graphics processor, a GPU pipeline, a wireless communication device, and/or any apparatus that may perform graphics processing as used in connection with the examples of FIGS. 1-7.

At 902, the GPU may generate one or more of at least one first frame or at least one second frame based on application data, as described in connection with the examples in FIGS. 1-7. For example, as described in 710 of FIG. 7, GPU component 702 may generate one or more of at least one first frame or at least one second frame based on application data. Further, step 902 may be performed by processing unit 120 in FIG. 1.

At 904, the GPU may select at least one image in the at least one first frame based on application data, where a color analysis is performed based on the selected at least one image, as described in connection with the examples in FIGS. 1-7. For example, as described in 720 of FIG. 7, GPU component 702 may select at least one image in the at least one first frame based on application data, where a color analysis is performed based on the selected at least one image. Further, step 904 may be performed by processing unit 120 in FIG. 1. In some instances, the at least one image may be associated with a geometry buffer of the at least one first frame. Also, the application data may correspond to heuristics of the at least one first frame.

At 906, the GPU may compress one or more tiles of the at least one first frame, where a color analysis is performed based on the compressed one or more tiles, as described in connection with the examples in FIGS. 1-7. For example, as described in 730 of FIG. 7, GPU component 702 may compress one or more tiles of the at least one first frame, where a color analysis is performed based on the compressed one or more tiles. Further, step 906 may be performed by processing unit 120 in FIG. 1. The compressed one or more tiles may correspond to compressed metadata of the at least one first frame.

At 908, the GPU may perform a color analysis on at least one first frame of a plurality of frames, the color analysis being performed based on at least one image in the at least one first frame, as described in connection with the examples in FIGS. 1-7. For example, as described in 740 of FIG. 7, GPU component 702 may perform a color analysis on at least one first frame of a plurality of frames, the color analysis being performed based on at least one image in the at least one first frame. Further, step 908 may be performed by processing unit 120 in FIG. 1. The color analysis may be performed via a compute pass at a graphics processing unit (GPU) or via hardware at the GPU.

At 910, the GPU may generate a frequency map for at least one second frame of the plurality of frames based on the performed color analysis, as described in connection with the examples in FIGS. 1-7. For example, as described in 750 of FIG. 7, GPU component 702 may generate a frequency map for at least one second frame of the plurality of frames based on the performed color analysis. Further, step 910 may be performed by processing unit 120 in FIG. 1. In some aspects, the frequency map may be a lookup table (LUT). For instance, generating the frequency map may include generating a lookup table (LUT) based on the color analysis.

In some instances, the frequency map may be filtered to account for a difference between the at least one first frame and the at least one second frame. The difference between the at least one first frame and the at least one second frame may correspond to a frame delta. Further, the frequency map may be filtered based on a kernel. The frequency map may also correspond to a variable rate shading (VRS) image.

At 912, the GPU may select frequency data for the at least one second frame based on the frequency map for the at least one second frame, as described in connection with the examples in FIGS. 1-7. For example, as described in 760 of FIG. 7, GPU component 702 may select frequency data for the at least one second frame based on the frequency map for the at least one second frame. Further, step 912 may be performed by processing unit 120 in FIG. 1. The frequency data for the at least one second frame may correspond to one or more variable rate shading (VRS) rates.

At 914, the GPU may render the at least one second frame based on the frequency map for the at least one second frame, the at least one second frame being rendered after the at least one first frame, as described in connection with the examples in FIGS. 1-7. For example, as described in 770 of FIG. 7, GPU component 702 may render the at least one second frame based on the frequency map for the at least one second frame, the at least one second frame being rendered after the at least one first frame. Further, step 914 may be performed by processing unit 120 in FIG. 1.

At 916, the GPU may transmit, to a display or a buffer, the at least one second frame, where the at least one second frame is transmitted after the at least one second frame is rendered based on the frequency map, as described in connection with the examples in FIGS. 1-7. For example, as described in 780 of FIG. 7, GPU component 702 may transmit, to a display or a buffer, the at least one second frame, where the at least one second frame is transmitted after the at least one second frame is rendered based on the frequency map. Further, step 916 may be performed by processing unit 120 in FIG. 1.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for performing a color analysis on at least one first frame of a plurality of frames, the color analysis being performed based on at least one image in the at least one first frame; means for generating a frequency map for at least one second frame of the plurality of frames based on the performed color analysis; means for rendering the at least one second frame based on the frequency map for the at least one second frame, the at least one second frame being rendered after the at least one first frame; means for selecting the at least one image in the at least one first frame based on application data, where the color analysis is performed based on the selected at least one image; means for compressing one or more tiles of the at least one first frame, where the color analysis is performed based on the compressed one or more tiles; means for selecting frequency data for the at least one second frame based on the frequency map for the at least one second frame; means for generating one or more of the at least one first frame or the at least one second frame based on application data; and means for transmitting, to a display or a buffer, the at least one second frame, where the at least one second frame is transmitted after the at least one second frame is rendered based on the frequency map.

The subject matter described herein may be implemented to realize one or more benefits or advantages. For instance, the described graphics processing techniques may be used by a GPU, a graphics processor, or some other processor that may perform graphics processing to implement the dynamic variable rate shading techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize dynamic variable rate shading techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: perform a color analysis on at least one first frame of a plurality of frames, the color analysis being performed based on at least one image in the at least one first frame; generate a frequency map for at least one second frame of the plurality of frames based on the performed color analysis; and render the at least one second frame based on the frequency map for the at least one second frame, the at least one second frame being rendered after the at least one first frame.

Aspect 2 is the apparatus of aspect 1, where the at least one processor is further configured to: select the at least one image in the at least one first frame based on application data, where the color analysis is performed based on the selected at least one image.

Aspect 3 is the apparatus of any of aspects 1 and 2, where the at least one image is associated with a geometry buffer of the at least one first frame.

Aspect 4 is the apparatus of any of aspects 1 to 3, where the application data corresponds to heuristics of the at least one first frame.

Aspect 5 is the apparatus of any of aspects 1 to 4, where the at least one processor is further configured to: compress one or more tiles of the at least one first frame, where the color analysis is performed based on the compressed one or more tiles.

Aspect 6 is the apparatus of any of aspects 1 to 5, where the compressed one or more tiles correspond to compressed metadata of the at least one first frame.

Aspect 7 is the apparatus of any of aspects 1 to 6, where generating the frequency map includes: generating a lookup table (LUT) based on the color analysis.

Aspect 8 is the apparatus of any of aspects 1 to 7, where the frequency map is filtered to account for a difference between the at least one first frame and the at least one second frame.

Aspect 9 is the apparatus of any of aspects 1 to 8, where the difference between the at least one first frame and the at least one second frame corresponds to a frame delta.

Aspect 10 is the apparatus of any of aspects 1 to 9, where the frequency map is filtered based on a kernel.

Aspect 11 is the apparatus of any of aspects 1 to 10, where the frequency map corresponds to a variable rate shading (VRS) image.

Aspect 12 is the apparatus of any of aspects 1 to 11, where the at least one processor is further configured to: select frequency data for the at least one second frame based on the frequency map for the at least one second frame.

Aspect 13 is the apparatus of any of aspects 1 to 12, where the frequency data for the at least one second frame corresponds to one or more variable rate shading (VRS) rates.

Aspect 14 is the apparatus of any of aspects 1 to 13, where the at least one processor is further configured to: generate one or more of the at least one first frame or the at least one second frame based on application data.

Aspect 15 is the apparatus of any of aspects 1 to 14, where the color analysis is performed via a compute pass at a graphics processing unit (GPU) or via hardware at the GPU.

Aspect 16 is the apparatus of any of aspects 1 to 15, where the at least one processor is further configured to: transmit, to a display or a buffer, the at least one second frame, where the at least one second frame is transmitted after the at least one second frame is rendered based on the frequency map.

Aspect 17 is the apparatus of any of aspects 1 to 16, further including at least one of an antenna or a transceiver coupled to the at least one processor.

Aspect 18 is a method of graphics processing for implementing any of aspects 1 to 17.

Aspect 19 is an apparatus for graphics processing including means for implementing any of aspects 1 to 17.

Aspect 20 is a computer-readable medium storing computer executable code, the code when executed by a processor causes the at least one processor to implement any of aspects 1 to 17.

What is claimed is:

1. An apparatus for graphics processing, comprising:
   a memory; and
   at least one processor coupled to the memory and configured to:
   select at least one image in at least one first frame of a plurality of frames based on application data, wherein the at least one image is associated with a geometry buffer of the at least one first frame;
   perform a color analysis on the at least one first frame of the plurality of frames, wherein the at least one processor is configured to perform the color analysis further based on the selected at least one image in the at least one first frame;
   generate a frequency map for at least one second frame of the plurality of frames based on the performed color analysis; and
   render the at least one second frame based on the frequency map for the at least one second frame, wherein the at least one processor is configured to render the at least one second frame after the at least one first frame.

2. The apparatus of claim 1, wherein the application data corresponds to heuristics of the at least one first frame.

3. The apparatus of claim 1, wherein the at least one processor is further configured to:
   compress one or more tiles of the at least one first frame, wherein the at least one processor is configured to perform the color analysis based on the compressed one or more tiles.

4. The apparatus of claim 3, wherein the compressed one or more tiles correspond to compressed metadata of the at least one first frame.

5. The apparatus of claim 1, wherein to generate the frequency map, the at least one processor is configured to: generate a lookup table (LUT) based on the color analysis.

6. The apparatus of claim 1, wherein the at least one processor is configured to filter the frequency map to account for a difference between the at least one first frame and the at least one second frame.

7. The apparatus of claim 6, wherein the difference between the at least one first frame and the at least one second frame corresponds to a frame delta.

8. The apparatus of claim 6, wherein the at least one processor is configured to filter the frequency map based on a kernel.

9. The apparatus of claim 1, wherein the frequency map corresponds to a variable rate shading (VRS) image.

10. The apparatus of claim 1, wherein the at least one processor is further configured to:
    select frequency data for the at least one second frame based on the frequency map for the at least one second frame.

11. The apparatus of claim 10, wherein the frequency data for the at least one second frame corresponds to one or more variable rate shading (VRS) rates.

12. The apparatus of claim 1, wherein the at least one processor is further configured to:
    generate the at least one second frame based on the application data.

13. The apparatus of claim 1, wherein the at least one processor is configured to perform the color analysis via a compute pass at a graphics processing unit (GPU).

14. The apparatus of claim 1, further comprising a transceiver coupled to the at least one processor, wherein the at least one processor is further configured to:
    transmit, to a display, the at least one second frame, wherein the at least one processor is configured to transmit the at least one second frame after being configured to render the at least one second frame based on the frequency map.

15. A method of graphics processing, comprising:
    selecting at least one image in at least one first frame of a plurality of frames based on application data, wherein the at least one image is associated with a geometry buffer of the at least one first frame;
    performing a color analysis on the at least one first frame of the plurality of frames, the color analysis being performed further based on the selected at least one image in the at least one first frame;

generating a frequency map for at least one second frame of the plurality of frames based on the performed color analysis; and rendering the at least one second frame based on the frequency map for the at least one second frame, the at least one second frame being rendered after the at least one first frame.

16. The method of claim 6, wherein the application data corresponds to heuristics of the at least one first frame.

17. The method of claim 15, further comprising:
compressing one or more tiles of the at least one first frame, wherein the color analysis is performed based on the compressed one or more tiles.

18. The method of claim 17, wherein the compressed one or more tiles correspond to compressed metadata of the at least one first frame.

19. The method of claim 15, wherein generating the frequency map comprises: generating a lookup table (LUT) based on the color analysis.

20. The method of claim 15, wherein the frequency map is filtered to account for a difference between the at least one first frame and the at least one second frame.

21. The method of claim 20, wherein the difference between the at least one first frame and the at least one second frame corresponds to a frame delta.

22. The method of claim 20, wherein the frequency map is filtered based on a kernel.

23. The method of claim 15, wherein the frequency map corresponds to a variable rate shading (VRS) image.

24. The method of claim 15, further comprising:
selecting frequency data for the at least one second frame based on the frequency map for the at least one second frame.

25. The method of claim 24, wherein the frequency data for the at least one second frame corresponds to one or more variable rate shading (VRS) rates.

26. The method of claim 15, further comprising:
generating the at least one second frame based on the application data.

27. The method of claim 15, wherein the color analysis is performed via a compute pass at a graphics processing unit (GPU).

28. The method of claim 15, further comprising:
transmitting, to a display, the at least one second frame, wherein the at least one second frame is transmitted after the at least one second frame is rendered based on the frequency map.

29. An apparatus for graphics processing, comprising:
means for selecting at least one image in at least one first frame of a plurality of frames based on application data, wherein the at least one image is associated with a geometry buffer of the at least one first frame;

means for performing a color analysis on the at least one first frame of the plurality of frames, the color analysis being performed further based on the selected at least one image in the at least one first frame;

means for generating a frequency map for at least one second frame of the plurality of frames based on the performed color analysis; and means for rendering the at least one second frame based on the frequency map for the at least one second frame, the at least one second frame being rendered after the at least one first frame.

30. A computer-readable medium storing computer executable code for graphics processing, the code when executed by a processor causes the processor to:

select at least one image in at least one first frame of a plurality of frames based on application data, wherein the at least one image is associated with a geometry buffer of the at least one first frame;

perform a color analysis on the at least one first frame of the plurality of frames, the color analysis being performed further based on the selected at least one image in the at least one first frame;

generate a frequency map for at least one second frame of the plurality of frames based on the performed color analysis; and render the at least one second frame based on the frequency map for the at least one second frame, the at least one second frame being rendered after the at least one first frame.

* * * * *